United States Patent
Ree

(10) Patent No.: US 7,213,074 B2
(45) Date of Patent: *May 1, 2007

(54) METHOD USING RECEIVE AND TRANSMIT PROTOCOL AWARE LOGIC MODULES FOR CONFIRMING CHECKSUM VALUES STORED IN NETWORK PACKET

(75) Inventor: Bradley Richard Ree, Snellville, GA (US)

(73) Assignee: Bradley R Ree, Cumming, GA (US)

( * ) Notice: Subject to any disclaimer, the term of this patent is extended or adjusted under 35 U.S.C. 154(b) by 899 days.

This patent is subject to a terminal disclaimer.

(21) Appl. No.: 10/458,530

(22) Filed: Jun. 10, 2003

(65) Prior Publication Data

US 2004/0030754 A1    Feb. 12, 2004

Related U.S. Application Data

(60) Provisional application No. 60/388,394, filed on Jun. 12, 2002.

(51) Int. Cl.
*G06F 15/16* (2006.01)

(52) U.S. Cl. ........................................ 709/230; 710/52

(58) Field of Classification Search ........ 709/213–215, 709/245, 250, 230; 710/5–7, 52–57; 375/259, 375/389, 463

See application file for complete search history.

(56) References Cited

U.S. PATENT DOCUMENTS

| | | | | |
|---|---|---|---|---|
| 6,888,937 | B1* | 5/2005 | Kurapati | 379/265.02 |
| 2001/0001616 | A1* | 5/2001 | Rakib et al. | 375/259 |
| 2001/0047406 | A1* | 11/2001 | Araujo et al. | 709/223 |
| 2001/0053148 | A1* | 12/2001 | Bilic et al. | 370/389 |
| 2002/0013821 | A1* | 1/2002 | Kasper | 709/213 |
| 2002/0071450 | A1* | 6/2002 | Gasbarro et al. | 370/463 |
| 2002/0124108 | A1* | 9/2002 | Terrell et al. | 709/245 |
| 2004/0003126 | A1* | 1/2004 | Boucher et al. | 709/250 |
| 2004/0030754 | A1* | 2/2004 | Ree | 709/213 |

* cited by examiner

*Primary Examiner*—Le Hien Luu

(57) ABSTRACT

The invention provides a low-cost, high-bandwidth file server, which is implemented in a single integrated semiconductor. High-bandwidth is achieved through the use of a shared memory buffer, protocol aware logic, and a modified network stack. The shared memory buffer allows data flow from the network to the storage device without the need of a single copy. The protocol aware logic and modified network stack also greatly improves bandwidth, while decreasing the processor workload. Another improvement allows for a smaller processor that can run at slower clock speeds, and thus requires far less silicon while using far less power than the traditional approach.

11 Claims, 7 Drawing Sheets

METHOD USING RECEIVE AND TRANSMIT PROTOCOL AWARE LOGIC MODULES FOR CONFIRMING CHECKSUM VALUES STORED IN NETWORK PACKET

This application builds upon concepts in the United State provisional application assigned to Programmable Products, Inc., the assignee of the present application. More specifically, this application claims priority to U.S. Provisional Application No. 60/388,394 filed Jun. 12, 2002 for File Server. The application is incorporated by reference, however, to the extent that they differ from the material in this application, (barring clerical error) the latter application controls.

BACKGROUND OF THE INVENTION

1. Field of Invention

The present invention relates generally to the shared data storage field, and more particularly, to a packet based network file server with an improved data transfer method.

2. Description of Related Art

Packet based networks are built around a client/server relationship. Clients are devices or computers that request data to be received or sent from a server. In most applications, clients are personal computers. Servers are devices or computers that have services available for clients, and wait for a client to request these services. A files server is a server whose service is to provide an interface to a storage device connected to or embedded in the file server. File servers are very useful when data must be shared between several people on a local area network (LAN), or a wide area network (WAN).

Traditional file servers (see FIG. 1) contain a host processor 130 running a file system and network stack, system memory 150, peripheral bus 195, DMA engine 140 that copies data to and from devices on the peripheral bus 195 and the system memory 150, a storage device 170 connected to the peripheral bus 195 through a storage interface 160, and a network interface card (NIC) 180 connected to the peripheral bus 195. The NIC 180 consists of a network Physical interface 100, Network MAC 110, and network buffers 120.

The most common network protocol is TCP, which is first encapsulated in the IP protocol, and then in the Ethernet protocol. A TCP packet with payload is illustrated in FIG. 2. The payload 240 first is prefixed with a TCP header 230, and then an IP header 220, and finally an Ethernet header 210. As the entire packet 260 is being transmitted, a checksum is calculated, and then appended to the end 250. FIG. 3 illustrates a packet containing file transfer data. These packets are still encapsulated in TCP packets, but also contain one or more file server protocol headers. Therefore the data payload 350 from the storage device 170 is first encapsulated in at least one file server protocol header 340, then in a TCP header 330, then an IP header 320, and finally an Ethernet header 310. During transmission, the Ethernet checksum 360 is appended to the end of the packet 370. For ease of discussion, the file server protocol headers 380 will include the Ethernet header 310, IP header 320, TCP header 330, and all the file server headers 340.

A connection between a client and server is referred to as a socket. For a TCP connection, the server's IP address, client's IP address, server's port number, and client's port number identify the socket. Every TCP packet contains a sequence number and an acknowledge number. When a client sends a packet to the server, the client will insert the client's sequence number in the sequence number field, and the client's version of the server's sequence number in the acknowledge field. Whenever the client sends a packet with any payload, the client will increment the client's sequence number following the transmission of the packet by the client. Whenever the client receives a packet from the server, the client will first increment the client's version of the server's sequence number by the number of bytes received in the payload of the packet. The client will the send an acknowledge packet to the server using the new value of the client's version of the server's sequence number. Using this method, packet order can be determined at the receiver, and the transmitter can determine what packets have been received by the receiver. If an acknowledge packet is not received within a period of time, the transmitter will resend the previously transmitted packet.

There are two types of packets the file server must handle. The first is packets received from the client to the file server. These receive packets include those with payloads bound for the file server's processor, and those with data for the storage device. The second packet is transmitted from the file server's storage device to the client. These transmit packets could include packet generated only in the processor's network stack. The only difference being the payload did not have to be read from the storage device first.

Prior Art File Server Packet Receive Processing

Having reference to FIG. 1 and FIG. 4, these are the steps associated with receiving a network packet 370 from a client to the file server. In order to promote the description of the process to one of skill in the art, the process is shown by a combination of interaction steps 100 to 199 on FIG. 1 and process steps 400 to 499 on FIG. 4.

STEP 400—The client sends a packet 370 with Ethernet Checksum 360 to the server through the Network 190.

STEP 105/115/125/405—The packet 370 is received through the Network Physical Interface 100 and converted to a digital stream, which is then decoded in the Network MAC 110 and written into the Network Buffer 120.

STEP 127/410—The Network MAC 110 informs the Processor of a valid receive packet 370.

STEP 145/155/415—The Processor 120 configures the DMA Engine 140 to copy the receive packet 370 from the Network Buffer 120 to the RAM 150 over the peripheral bus 195.

STEP 135/165/137/420—The DMA Engine 140 copies the receive packet 370 from the Network Buffer 120 into the RAM 150 using the peripheral bus 195. When the copy is complete, the DMA Engine 140 informs the Processor 130.

STEP 145/165/425—The Processor 130 processes the protocol headers 380 and updates the socket structure stored in the RAM 150.

BRANCH 430—The Processor 130 verifies the client's sequence number in the protocol headers 380. Data flow will continue if the packet 370 is not out of sequence at STEP 440.

STEP 145/165/435—The Processor 130 will process the out of sequence error, and release the packet buffer in the RAM 150. Data flow is terminated.

BRANCH 440—The Acknowledge is checked against any transmit packets for the current socket. If no transmit buffers are currently waiting for the received acknowledge, data flow will continue at 450.

STEP 145/165/445—The Processor 130 will release any transmit buffers in the RAM 150 in which the receive acknowledge number allows.

STEP 145/165/450—The Processor 130 processes all protocol headers 380 and updates the socket structures and file server structures as needed in the RAM 150.

BRANCH 455—If the payload 350 is bound for the Storage Device 170, data flow will continue at STEP 465.

STEP 145/165/460—The Processor 130 will consume the payload 350, and release the receive buffer in the RAM 150. Data flow is terminated.

STEP 145/155/465—The Processor 130 configures the DMA Engine 140 to copy the payload 350 to the Storage Device 170 through the Storage Interface 160.

STEP 155/165/175/137/470—The DMA Engine 140 reads the payload 350 from the RAM 150 and writes the payload 350 to the Storage Interface 160 using the peripheral bus 195.

STEP 145/165/475—The Processor 130 builds the Acknowledge packet in RAM 150 for the current socket.

STEP 145/155/480—The Processor 130 configures the DMA Engine 140 to copy the packet 370 to the Network Buffer 120.

STEP 135/155/165/137/485—The DMA Engine 140 copies the packet 370 from the RAM 150 to the Network Buffer 120 using the peripheral bus 195. When the copy has completed, the DMA engine 140 informs the Processor 130.

STEP 127/490—The Processor 130 informs the Network MAC 110 of a valid transmit packet.

STEP 125/115/105/495—The Network MAC 110 reads the transmit packet 370 from the Network Buffer 120 and sends the transmit packet 370 to the client through the Network Physical Interface 100 and Network 190.

Prior Art File Server Packet Transmit Processing

Having reference to FIG. 1 and FIG. 5, these are the steps associated with transmitting a network packet 370 from the file server to a client. In order to promote the description of the process to one of skill in the art, the process is shown by a combination of interaction steps 100 to 199 on FIG. 1 and process steps 500 to 599 on FIG. 5.

STEP 145/155/500—The Processor 130 configures the DMA Engine 140 to read a payload 350 from the Storage Device 170 connected to the Storage Interface 160, and write it into the RAM 150.

STEP 185/175/155/165/137/505—The DMA Engine 140 reads the payload 350 from the storage interface and informs the Processor 130 when completed.

STEP 145/165/510—The Processor 130 builds the Protocol Headers 380 for the current socket.

STEP 145/165/515—The Processor 130 copies the payload 350 to the end of the protocol headers 360.

STEP 145/165/520—The Processor 130 generates the CRC values for the protocol headers 380.

STEP 145/155/525—The Processor 130 configures the DMA Engine 140 to copy the packet 370 to the Network buffer 120.

STEP 135/155/137/530—The DMA Engine 140 copies the packet to the Network buffer 120 from the RAM 150. The Processor 130 is informed when the copy is completed.

STEP 127/535—The Processor 130 informs the Network MAC 110 that there is a valid packet to be transmitted.

STEP 105/115/125/540—The Network MAC 110 reads the transmit packet 370 from the Network Buffer 120 and sends it to the Client through the Network Physical Interface 100 and the Network 190.

STEP 545—The Clients sends a acknowledge packet.

As illustrated by FIG. 1, and the associated descriptions, the prior art suffers from several drawbacks. First, large amounts of memory are required. The Network Interface Controller 180 and Processor 130 must contain buffers, which increase system cost and complexity. Another drawback is the packet 370, and payload 350 must be copied across the shared peripheral bus many times. This creates a bottleneck in the system performance as data rates increase. Finally, many protocol-processing tasks are better suited for hardware implementations that allow for parallel processing, as opposed to the current sequential methods used in a pure software implementation.

While the prior art has suggested the use of a state machine in order to address previously recognized shortcomings with the prior art, this solution does not address the issue of future protocol support. Since a state machine solution calls for the protocol processing to be handled purely in hardware, the addition of new protocols or changes to existing protocols would require a new device to be built. Replacing those devices already in use becomes very difficult and expensive. Another problem with the state machine solution is special user software cannot be performed in the device. Therefore, another processor must be attached to the state machine device in order to run a user's application. Finally, the state machine solution becomes very complex and expensive for certain protocols. For example, a file server is very complex. It must be configurable to handle many different user accounts. The state machines to handle these accounts would become far too large and complex to be commercially viable.

While the prior art has taught that offloading the steps of checksum generation and verification from the processor can be beneficial, this offloading by itself is not sufficient to provide a highly efficient method for handling incoming and outgoing packets. This prior art solution does not eliminate the number of buffers required, nor does it remove the need to copy the packet between each of these buffers. Likewise, this prior art solution does not allow for the protocol header to be processed in parallel with the data payload reception.

While the prior art has taught filtering for established socket connections that allow the network interface to pass the protocol headers to the network stack and the data payload to the user application, it only occurs after the protocol headers and data payload are completely received in the network buffer. Both the protocol headers and data payload must still be copied into the processor's memory. The data payload must then be copied into the user interface. This prior art solution is adapted for interfacing with a user application residing on a personal computer. This solution could also be applied to an embedded environment in which the application is replaced with a user buffer and user interface. In this case, three separate buffers are still required; the network buffer, processor memory, and user buffer. Data copies are also still required to move the packet portions between the buffers. This prior art solution also has shortcomings for packet transmissions from the user interface to the network interface. The protocol checksums are based on the data payload, and protocol headers. Since these two parts are separated in the prior art, the transmit protocol checksum generation becomes difficult.

It is an object of the present invention to provide an improved method for handling the receipt of incoming packets in order to improve the efficiency of handling incoming packets.

It is another object of the present invention to provide an improved method for handling the outgoing packets in order to improve the efficiency of handling outgoing packets.

It is a further object of the present invention to develop a method that uses a shared buffer such that data may be shared among the network interface, the storage device interface, or the processor without the need to be copied for each subsystem to use the data.

It is yet another object of the present invention to use "protocol aware logic" in conjunction with the write path to the shared buffer to offload a portion of the processor workload.

It is yet another object of the present invention to develop a more efficient method for processing packets by processing solely the header portion of packets and not the data payload.

It is yet another object of the present invention to develop a method that increases throughput through use of parallel processing and the avoidance of memory copies of packets.

It is yet another object of the present invention to allow certain packets to be passed from the network receiver to the user interface without the use of the processor.

It is yet another object of the present invention to develop a method that increases the throughput of header generation by allowing hardware to build headers based on the socket. This hardware can directly read the required data from many different locations in RAM to build the appropriate header.

These and other advantages of the present invention are apparent from the drawings and the detailed description that follows.

SUMMARY OF THE INVENTION

The invention provides a low-cost, high-bandwidth file server, which is implemented in a single integrated circuit. The transmit and receive data paths use protocol aware logic, which reduces the software workload. The processor located in the device has been optimized for the file server application. Since the processor is not general purpose, it has been greatly reduced in size and speed while increasing real performance. The protocol aware logic offloads much of the processor workload, allowing for a smaller processor to be used, resulting in a low-cost, low-power solution. Since there are few different protocol headers required, hardware has been added which can directly read the processor's RAM and build these transmit headers into the shared buffer.

Another innovation is the use of the shared memory buffers located between the network interface, storage interface, and processor. When the MAC receiver receives packets, they are directly written into the shared buffer without any memory copies. When packets are detected containing data to be written to the storage device, the storage interface directly reads the payload from the shared buffer using the starting address offset supplied by the processor. When the storage interface reads the storage device, the data is directly written into the shared buffer using the starting address offset supplied by the processor. The starting address is the location of the first byte of payload. When a packet is ready for network transmission, the MAC transmitter directly reads the packet from the shared buffer and transmits the data onto the network. The processor also has direct access to the shared buffers, even while the MAC receiver is still writing the payload into the shared buffer. The shared buffer structure and pipelining of processing greatly increase system bandwidth.

Still another innovation is the use of hardware logic to automatically check if incoming packets have the correct sequence and generate the correct response. This type of logic can be used to automatically acknowledge received packets and to release transmit packets when acknowledged by the client.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 6:
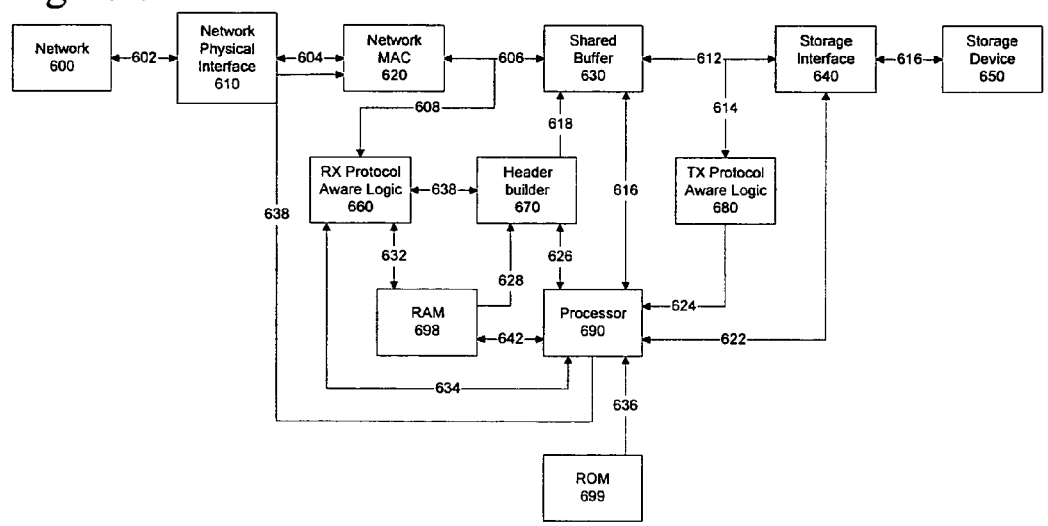
FIG. 6 is a block diagram of one preferred embodiment of the file server.

FIG. 6 illustrates the preferred embodiment of the improved file server. The device consists of three basic modules: network interface, storage interface, and processor. The network interface consists of a Network Physical Interface 610 connected to a Network MAC 620. The Network MAC 620 reads and writes directly into a Shared Buffer 630, in which the Receive Protocol Aware Logic 660 monitors all accesses. The Storage Device 650 is connected to the Storage Interface 640 that writes and reads data into the Shared buffer 630. The Transmit Protocol Aware Logic 680 monitors all accesses from the Storage Interface 640 into the Shared Buffer 630. The Processor core consist of a Processor 690, with program ROM 699, and data RAM 698. To improve header construction, the Header builder 670 was added to build headers from the RAM 698 and into the Shared Buffer 630. The Processor 690 also has access to the Shared Buffer 630.

The RAM contains file server parameters such as IP address and MAC address, but also contains socket structures. The socket structure contains at least the client and server's IP address, port numbers, sequence numbers, and state information. The structure also contains flags used by the Header Builder 670 and the Receive Protocol Aware logic 680. The socket structures are located at fixed locations such that the socket ID is the address of the socket structure. This form of socket identification improves system throughput, such that only a single address needs to be passed between the different modules in the file server, and each module can directly access the pertinent data regarding the socket. In the case of the RX Protocol Aware logic 660, the socket ID is determined while packet is being written into the Shared Buffer. The RX Protocol Aware Logic can then update the sequence and acknowledge numbers without the processor's intervention.

The Shared Buffer 630 also provides a large boost in throughput. Since data is directly written into or read from this buffer by the Network MAC 620 or the Storage Interface 640, there is no need for a DMA engine. Also, isolating the packet buffers from the processor's RAM 698 allows the flow of packets through the memory to have very little effect on the processor's 690 access to it's RAM 698.

There are two types of packets the file server must handle. The first type of packet is a packet received from the client, that is sent to the file server. These receive packets include packets with payloads bound for the file server's processor, and those with data for the storage device. The second type is a packet transmitted from the file server's storage device to the client. These transmit packets could include packets generated only in the processor's network stack or acknowledges to the client for received packets. The only difference being the payload did not have to be read from the storage device.

File Server Packet Receive Processing

Figure 3:
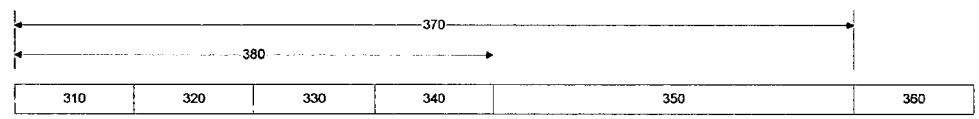
FIG. 3 is a diagram illustrating the prior art packet layers used in File Server network messages.
Figure 4:
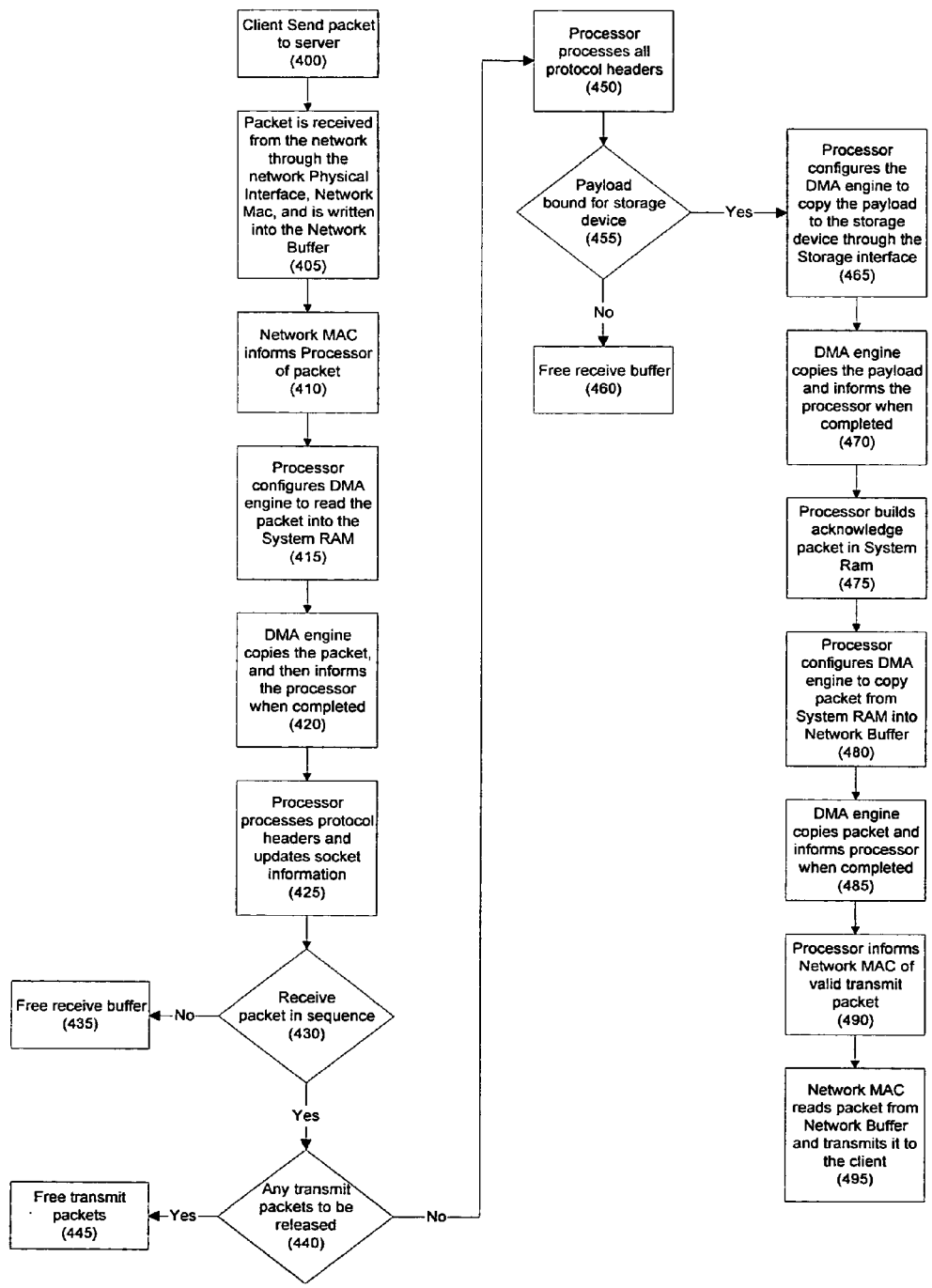
FIG. 4 is a flow chart illustrating the reception of packets in the prior art.
Figure 5:
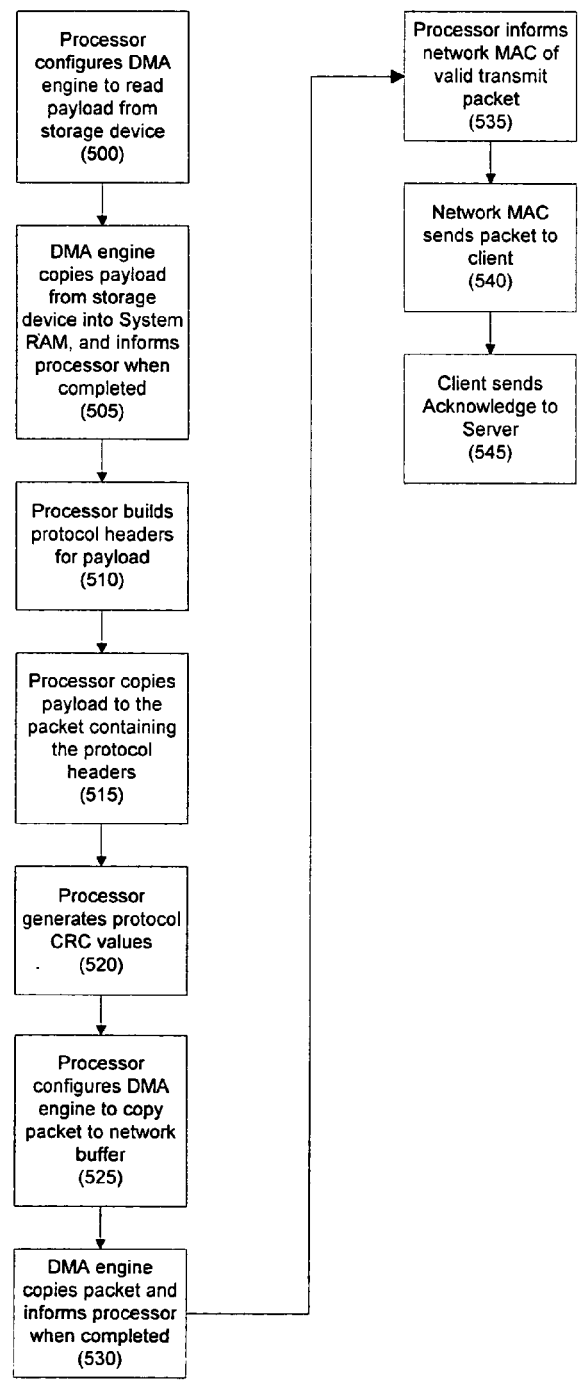
FIG. 5 is the flow chart illustrating the transmission of packets in the prior art.
Figure 7:
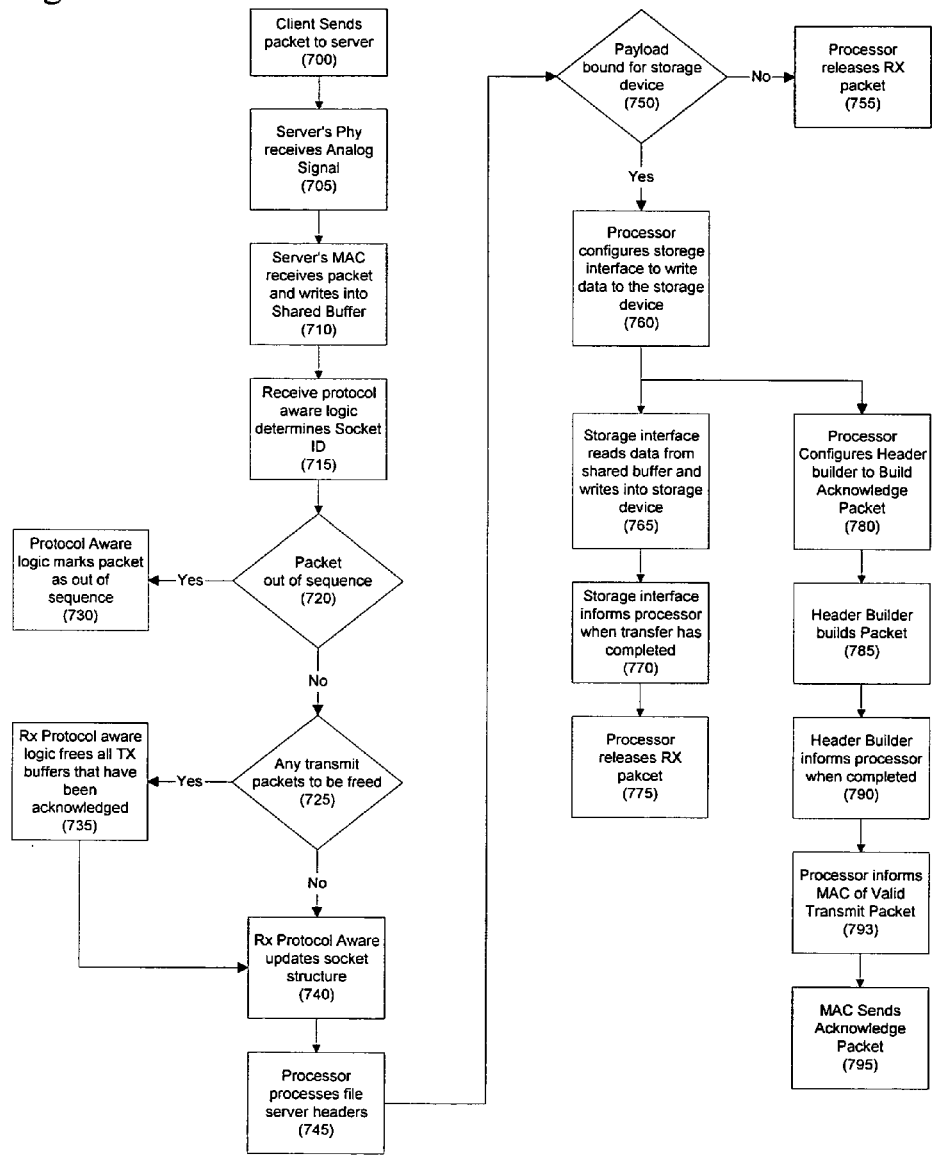
FIG. 7 is the flow chart illustrating the reception of packets in one preferred embodiment.

The preferred sequence of events for a packet received by the file server is shown in FIG. 6 and represented in FIG. 7. The data packets are illustrated in FIG. 3.

STEP 700—The clients sends a packet to the file server connected to the network 600.

STEP 602/604/705—The file server's network physical interface 610 receives the analog signal and converts it to a digital stream, which is then sent to the Network MAC 620.

STEP 606/710—The Network MAC 620 writes the packet 370 into the Shared Buffer 630.

STEP 608/632/715—The Receive Protocol Aware Logic 660 monitors the writing of data into the Shared Buffer 630 from the Network MAC 620, and determines the Socket ID of the incoming packet as stored in the RAM 698.

BRANCH 720—The Receive Protocol Aware Logic 660 determines if the incoming packet is out of sequence. If the packet is not out of sequence, data flow will continue at STEP 725.

STEP 730—The Receive protocol aware logic 660 will mark the packet 370 as being out of sequence. The packet 370 is then passed to the processor 690, in which the error may be processed. The data flow is terminated.

BRANCH 725—The Receive Protocol Aware Logic 660 will determine if any transmit buffers have been acknowledged by the receive packet 370. If no transmit buffers have been acknowledged, data flow will continue at STEP 740.

STEP 735—The Receive Protocol Aware Logic 660 will release any transmit buffer currently waiting for an acknowledge from the Client.

STEP 632/740—The Receive Protocol Aware Logic 660 will update the socket structure stored in the RAM with the current Client Sequence number, and any TCP state changes. Other file server state data will also be updated at this time. The Receive Protocol Aware Logic 660 has direct access to the RAM 698, and does not require the processor's 690 intervention.

STEP 616/745—The processor 690 processes the remaining protocol headers 380 that the Receive Protocol Aware Logic 660 could not process. This step allows the file server to be field upgradable to handle new protocols not embedded in the integrated circuit logic.

BRANCH 750—Many times the receive packet will not contain data for the storage device. If there is data for the storage device, data flow will continue at STEP 760.

STEP 616/755—The payload bound for the processor will be consumed by the processor, and then the receive buffer will be released. The data flow is terminated.

STEP 622/760—The Processor 690 configures the Storage Interface 640 such that the Storage Interface 640 can read the payload 350 and write it into the Storage Device 650. The basic configuration required is the start address of the payload 350, the length of the payload 350, and the start address of the storage device for the payload 350. Data flow also starts at STEP 780.

STEP 612/616/765—The Storage Interface 640 reads the Shared Buffer 630 and writes the data into the Storage Device 650.

STEP 622/770—The Storage Interface 640 informs the Processor 690 when the transfer has completed.

STEP 616/775—The Processor 690 releases the receive buffer in the Shared Buffer 630.

STEP 626/780—The Processor 690 configures the Header Builder 670 to build an Acknowledge packet for the current socket using the socket data structures stored in the RAM 698.

STEP 628/618/785—The Header Builder 670 reads the required data from the RAM 698 and write the acknowledge packet into the Shared Buffer 630.

STEP 626/790—The Header Builder 670 informs the Processor 690 that the acknowledge packet is valid.

STEP 638/793—The Processor 690 informs the Network MAC 620 of a valid transmit Packet.

STEP 602/604/606/795—The Network MAC 620 reads the acknowledge packet from the Shared Buffer 630, and sends the acknowledge packet to the Client through the Network Physical Interface 610 and the Network 600.

Figure 1:
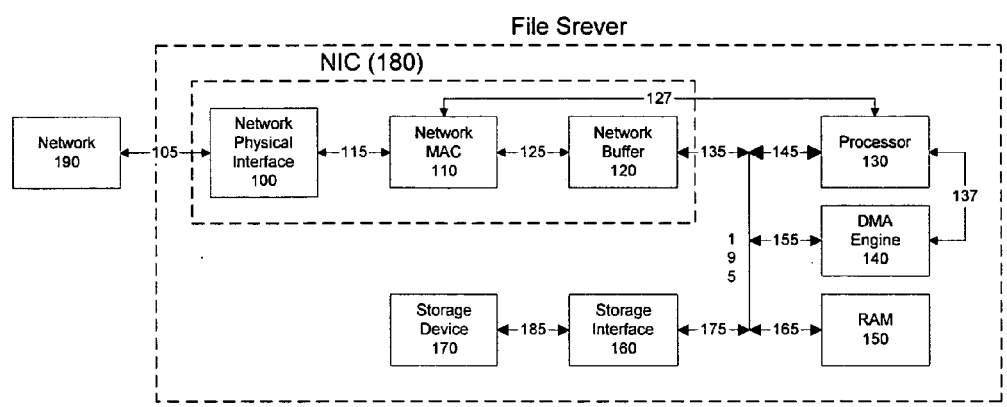
FIG. 1 is an exemplary block diagram of the prior art for file servers.

The invention has a number of major advantages for packet reception from the network 600 including:

First, data can move from the network 600 to the storage device 650 without any data copies. In contrast the prior art process illustrated in FIG. 1 made copies at step 420 and Step 470;

Second, the Shared Buffer 630 eliminates the use of two separate buffers as used in the current state of the art (120 and 150). The reduction not only reduces cost and complexity, but also separates the processor's program execution and variable storage from the packet buffer. Therefore, program execution does not have to halt while packets are being written into the Shared Buffer (630);

Third, the Receive Protocol Aware Logic 660 removes the time consuming tasks such as protocol and CRC verification by the processor;

Fourth, the protocol CRC calculations are performed in parallel while the packet is being written into the shared buffer 730, therefore the packet is known to be good or bad immediately after it has been received from the network 600;

Fifth, the Receive Protocol Aware Logic 660 identifies packets bound for established sockets. For those packets, the Receive Protocol Aware logic 660 provides a pointer to the socket structures in the RAM 698, verifies the incoming sequence number, and releases any transmit packets waiting for the incoming acknowledge number;

Sixth, the Header Builder 670 provides a high-speed method to build many of the common protocol headers. The data required for these headers does not have to be in continuous memory, and thus the data only needs to be stored once in RAM 698. The Header Builder can read non-sequential locations to build the required header.

File Server Packet Transmit Processing

Figure 8:
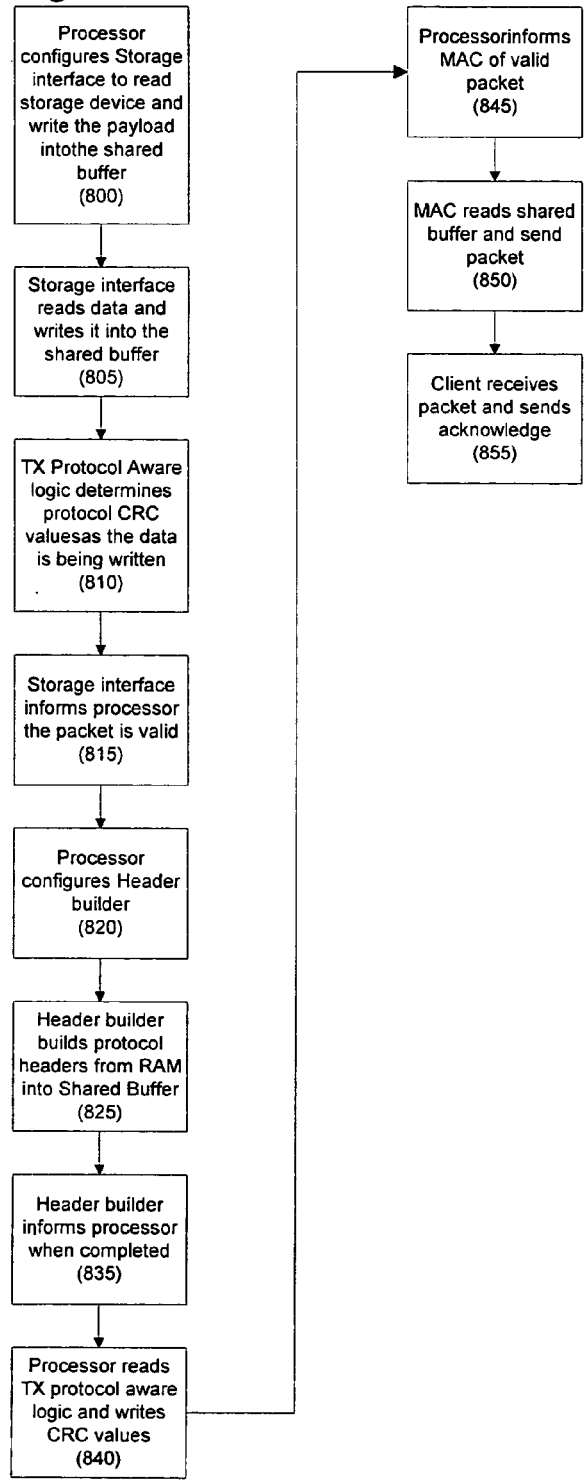
FIG. 8 is the flow chart illustrating the transmission of packets in one preferred embodiment.

The preferred sequence of events for a packet to be transmitted from the File Server's Storage device 650 is shown in FIG. 6, and represented in FIG. 8. The data packet is illustrated in FIG. 3.

STEP 622/800—The Processor 690 configures the Storage Interface 640 to read a payload 360 from the Storage Device 650 into the Shared Buffer 630 starting at a specified offset in the transmit buffer.

STEP 612/616/805—The Storage Interface 640 reads the payload 360 from the Storage Device 650, and writes the payload 360 into the Shared Buffer 630.

STEP 614/810—As the payload 360 is being written into the Shared Buffer 630, the Transmit Protocol Aware Logic 680 monitors the data writes, and determines the protocol checksum values.

STEP 622/815—The Storage Interface 640 informs the processor 690 that the payload 360 is valid.

STEP 626/820—The Processor 690 configures the Header Builder 670 to build the appropriate header for the socket in which the payload 360 belongs.

STEP 628/618/825—The Header builder 670 reads all required data for the protocol headers 380 from the RAM 698, and writes the data into the Shared Buffer 630. The Transmit Protocol Aware logic is also monitoring the writes and continues to update the protocol checksum values. The Header Builder 670 also updates the Server's Sequence number in the socket data structure located in RAM 698 for the current socket. The required acknowledge number and socket ID are also stored in the RX Protocol Aware Logic 660 for the current transmit buffer.

STEP 626/835—The Header Builder 670 informs the processor 690 when the header has been built.

STEP 624/616/840—The Processor 690 reads the CRC values from the Transmit Protocol Aware Logic and writes the CRC values into the transmit packet.

STEP 638/845—The Processor 690 informs the Network MAC 620 of the valid transmit packet in the Shared Buffer 630.

STEP 602/604/606/850—The Network MAC 620 reads the transmit packet in the Shared Buffer 630 and transmits it to the Client through the Network Physical Interface 610 and the Network 600.

The invention has a number of major advantages for packet transmission from the Storage device 650 to the Network 600 including:

First, data can move from the Storage Device 650 to the Network 600 without any data copies. In contrast the prior art process illustrated in FIG. 1 made copies at step 505, and Step 530;

Second, the shared buffer 630 eliminates the Network Buffer 120 and the packet buffers in RAM 150. The reduction not only reduces cost and complexity, but also separates the processor's program execution and variable storage from the packet buffer. Therefore, program execution does not have to halt while packets are being written into the Shared Buffer 630;

Third, the transmit Protocol Aware logic 680 eliminates the time consuming task such as protocol CRC generation by the processor;

Fourth, the protocol CRC calculations are performed in parallel while the packet is being written into the buffer by the Storage Interface 640, the Processor 690, or the Header builder 670;

Fifth, the Storage interface can be programmed to write into the Shared Buffer 630 with an offset to leave room for the protocol headers. This eliminates large amounts of memory to be set aside for each packet, and eliminates the data copy to move the payload to the end of the protocol headers.

ALTERNATIVE EMBODIMENTS

Those skilled in the art could apply many modifications to the preferred embodiment. One such modification would be to directly connect the Storage device 650 to the Shared Buffer 630. In this embodiment, the File Server device would be embedded directly into the Storage device. The advantage would be a low component cost since the Storage Interface located in the File Server and Storage Device would be eliminated.

Figure 9:
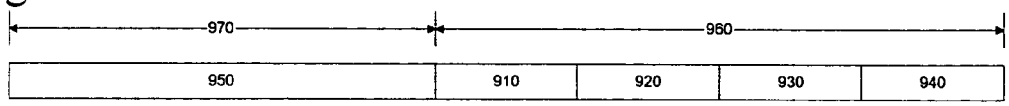
FIG. 9 is a diagram illustrating an alternative embodiment of the packet layers used in File Server network messages.

Another embodiment that would reduce complexity would be to organize the File Server Network transmit packets as illustrated in FIG. 9. The data payload 950 would be stored at the beginning of the buffer, followed by the Ethernet header 910, the IP header 920, the TCP header 930, and finally the Filer Server protocol headers 940. The Network MAC 620 would be informed of the payload length 970, and the header length 960. The Network MAC would then start by transmitting the protocol headers, then the payload. This improvement removes the requirement of the processor determining the header length before the Storage Interface 640 writes the payload 950 into the Shared Buffer 630. Prior art methods have been similar to this, but the data payload is written into the highest offset location assuming the largest header requirement. The protocol headers are then built from the payload to the start of the packet. The start of the protocol headers is passed to the Network MAC 620 for transmission. The disadvantage is that a very large packet buffer must be used for every packet, not just the packets requiring the large protocol headers.

Figure 2:
FIG. 2 is a diagram illustrating the prior art packet layers used in TCP network messages.

FIG. 2 and FIG. 3 was provided in order to provide context for the various manipulations to packet components by the prior art methods and the disclosed invention. The invention is not limited to the specific packet types illustrated in FIG. 1 and one of ordinary skill in the art could apply the teachings of the present invention to a device for processing another known packet format.

The preferred embodiment of the present invention implements the protocol aware logic on both the incoming and outgoing paths. One of skill in the art could implement the protocol aware logic on only one path. Such a network processor would be best used for an application with a disparity in upstream and downstream traffic such that the direction with the higher traffic flow would have the benefit of the protocol aware logic. One such application would be a video server, in which most of the data is in the outgoing path. Therefore, the receive direction would not need the speed improvements of the receive path.

The preferred embodiment offloads several tasks from the processor unit with network stack to the transmit protocol aware logic and the receive protocol aware logic. One of skill in the art could choose to retain one or more of these tasks for the processor unit with network stack. For example, the processor unit with network stack could perform the steps necessary to discern the socket for a network packet or data payload.

Those skilled in the art will recognize that the methods and apparatus of the present invention have many applications and that the present invention is not limited to the specific examples given to promote understanding of the present invention. Moreover, the scope of the present invention covers the range of variations, modifications, and substitutes for the system components described herein, as would be known to those of skill in the art.

The legal limitations of the scope of the claimed invention are set forth in the claims that follow and extend to cover their legal equivalents. Those unfamiliar with the legal tests for equivalency should consult a person registered to practice before the patent authority which granted this patent such as the United States Patent and Trademark Office or its counterpart.

I claim:

1. A method for a file server to process an incoming network packet, the file server comprising:
 a. A network interface adapted for connection to a communication network;
 b. A receive protocol aware logic module;
 c. A storage device;
 d. A processor unit with network stack; and
 e. Shared buffer accessible by: the network interface, the storage device, and the processor unit with network stack;

The method comprising:
 a. The network interface receiving a network packet from the network destined for a first existing socket and writing the network packet to a segment of memory in the shared buffer, the network packet having the properties of:
  i. Having at least one checksum indicating non-corrupted transmission; and
  ii. addressed to an existing socket;
  the network packet comprising:
  A) a transport header;
  B) a protocol header; and
  C) a data payload;
 b. The receive protocol aware logic module detecting the process of writing of the network packet to the shared buffer and confirming that a checksum value contained in the protocol header matches a newly calculated checksum; and
 c. The receive protocol aware logic module detecting the process of writing of the network packet to the shared buffer and confirming the sequence order of the packet.

2. The method of claim 1 wherein the shared buffer is comprised of at least two receives packet buffers.

3. The method of claim 1 wherein the receive protocol aware logic determines the acknowledgement number of the receive packet, and informs the file server as to which transmit buffers can be released.

4. The method of claim 1 wherein the receive protocol aware logic module updates the socket management structure stored in the processor memory accessible by the processor unit with network stack.

5. The method of claim 1 further comprising:
 a. Header builder logic capable of building an acknowledgement packet.

6. The method of claim 5 wherein the header builder is also capable of building transport headers.

7. The method of claim 1 wherein the shared buffer is capable of retransmitting non-acknowledged transmit packets.

8. A method for a file server to create a network packet to convey an outgoing network packet, the file server comprising:
 a. A Network interface adapted for connection to a communication network;
 b. A transmit protocol aware logic module;
 c. A header builder module;
 d. A Storage Device; and
 e. Shared buffer accessible by: the network interface, the storage device, and processor unit with network stack;

The method comprising:
 a. The storage device writes a data payload into the shared buffer;
 b. as the data payload is being written in to the shared buffer, the transmit protocol aware logic module begins to create at least one protocol checksum to be used in the network packet to convey the data payload;
 c. the processor configures the header builder to build the appropriate transport header in the shared buffer;
 d. the transmit protocol aware logic module providing at least on protocol checksum for use in the partially completed protocol header; and
 e. the network interface transmitting the network packet into the network.

9. The method of claim 8 wherein the network interface calculates a transport checksum for the network packet in preparation for transmitting the network packet into the network.

10. The method of claim 8 wherein the data payload is stored in a payload section of the shared buffer and the header information associated with the data payload is stored in a header section of the shared buffer and further comprising the network transmit logic automatically transmits the header portion and then the payload portion.

11. The method of claim 8 wherein the shared buffer is comprised of at least two transmit packet buffers.

* * * * *